S. McELHANEY.
Improvement in Hedge and Tree Trimmers.
No. 131,108.                      Patented Sep. 3, 1872.
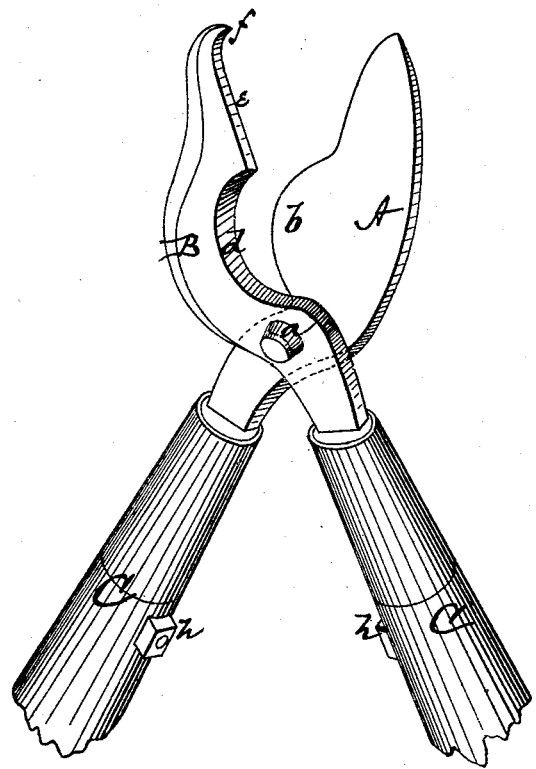
Witnesses:
Henry N. Miller
C. L. Evert
Inventor.
Samuel McElhaney
per Alexander Mason
Attorneys.

UNITED STATES PATENT OFFICE.

SAMUEL McELHANEY, OF MILLEDGEVILLE, ASSIGNOR OF ONE-HALF HIS RIGHT TO W. O. MILLIARD, OF STERLING, ILLINOIS.

IMPROVEMENT IN HEDGE AND TREE TRIMMERS.

Specification forming part of Letters Patent No. 131,108, dated September 3, 1872.

*To all whom it may concern:*

Be it known that I, SAMUEL MCELHANEY, of Milledgeville, in the county of Carroll and in the State of Illinois, have invented certain new and useful Improvements in Hedge and Tree Trimmers; and do hereby declare that the following is a full, clear, and exact description thereof, reference being had to the accompanying drawing and to the letters of reference marked thereon making a part of this specification.

The nature of my invention consists in the construction and arrangement of a hedge and tree pruner, as will be hereinafter more fully set forth.

In order to enable others skilled in the art to which my invention appertains to make and use the same, I will now proceed to describe its construction and operation, referring to the annexed drawing, which represents a side view of my pruning-tool.

A represents the cutting-blade, and B the holder, pivoted together at $a$, and their shanks secured in handles C C. The blade A has a convex cutting portion, $b$, and a corresponding concavity, $d$, formed in the holder B near the rivet $a$. The outer end or part of the cutting-blade is only slightly curved, as shown, and the edge of the holder beyond the concave portion is straight, as shown at $e$, with a hook, $f$, in the shape of a hawk-bill, formed upon the extreme point. The convex blade and concave holder near the rivet is a decided improvement, as it will cut larger limbs and with greater ease than either the concave or straight blades. With the outer portion of this tool small limbs may be cut clear down to the point, and the hook $f$ will hold to draw the limbs after they are cut away from the tree or hedge. On the handles C C are buttons or guards $h\ h$, to prevent them from coming too close together so as to injure the fingers of the operator.

Having thus fully described my invention, what I claim as new, and desire to secure by Letters Patent, is—

The cutting-blade A, provided with the convex part $b$, and the outer part only slightly curved, in combination with the holder B, having the concave part $d$ and straight part $e$, with the "hawk-bill" hook $f$ on the extreme point, all substantially as herein set forth.

In testimony that I claim the foregoing I have hereunto set my hand this 19th day of June, 1872.

SAMUEL McELHANEY.

Witnesses:
A. N. MARR,
WILLIAM LOWRY.